3,081,358
DISPROPORTIONATION OF CHLOROPERFLUOROPROPENES
Harry Agahigian, Denville, and Cyril Woolf, Morristown, N.J., assignors to Allied Chemical Corporation, New York, N.Y., a corporation of New York
No Drawing. Filed Apr. 27, 1960, Ser. No. 24,914
7 Claims. (Cl. 260—653.3)

This invention relates to manufacture of perhalopropenes and more particularly to production of 1,1-dichlorotetrafluoropropene - 1, and hexafluoropropene a known commercial monomer.

The chloropentafluoropropenes containing fluorine in the 2 - position, i.e. 1 - chloropentafluoropropene - 1 ($CF_3CF:CFCl$, B.P. 7.8° C.) and 3-chloropentafluoropropene-1 ($CF_2ClCF:CF_2$, B.P. 7.6° C.), because of the fluorine content in the first and third positions and the presence of only a single chlorine in the molecule, afford notably suitable starting materials for manufacture of hexafluoropropene if an economical process were available.

Contrary to expectation, it has been found that both of the starting materials mentioned may be disproportionated to $CF_3CF:CF_2$, B.P. minus 29.4° C. and to $CF_3CF:CCl_2$, B.P. plus 46.4° C. While disproportionation of chlorofluoromethanes and ethanes is known, prior art teaches that disproportionation of a chlorofluoropropene occurs only in the allylic position. Hence, it would not be anticipated that $CF_3CF:CFCl$ could be disproportionated since the allylic position (trihalomethyl) is already filled with fluorine. Sensitivity of $CF_2ClCF:CF_2$ to isomerization to $CF_3CF:CFCl$ is known. Thus, it would be expected that attempts to disproportionate $CF_2ClCF:CF_2$ would fail because of conversion of $CF_2ClCF:CF_2$ to $CF_3CF:CFCl$ which, for reasons just noted, is theoretically non-disproportionatable.

A major object of this invention is to provide a relatively simple method for disproportionating $CF_3CF:CFCl$ and $CF_2ClCF:CF_2$ to make $CF_3CF:CF_2$ and $CF_3CF:CCl_2$.

In accordance with the invention it has been found that certain solid aluminum fluoride ($AlF_3$) materials possess the properties of effectively disproportionating $$CF_3CF:CFCl$$

and $CF_2ClCF:CF_2$ by an easily controllable, all gas-phase, solid catalytic procedure by which the desired disproportionation products, $CF_3CF:CF_2$ and $$CF_3CF:CCl_2$$

may be made in good yields. Opposed to expectancy as based on prior art knowledge, it has been found that the catalytic material disclosed herein not only disproportionates both starting materials mentioned but also effects disproportionation of the two different starting materials to the same products.

Different types of aluminum fluorides are known. In general these materials are composed of $AlF_3$ crystals of relatively large size, i.e. not less than 1000 and usually several thousand Angstrom units radius and above, as in the case of commercial types of $AlF_3$ available on the market. The aluminum fluoride catalysts utilized in accordance with the present invention are of noncrystalline or "amorphous" structure, and when examined by X-ray diffraction technique show extremely small or sub-microscopic crystals designated as "crystallites." These aluminum fluorides are of crystallite size not greater than about 500 Angstrom units radius and are derived by reaction of aluminum chloride and HF. As crystallite size decreases, catalytic activity increases, and the preferred aluminum fluorides are those having crystallite size of about 200 A and below, as determined by X-ray diffraction technique. Catalytic aluminum fluorides of this type are more fully discussed in U.S.P. 2,676,996 of April 27, 1954 which discloses processes for making the same by procedures involving reaction of aluminum chloride and HF.

Practice of the invention comprises subjecting $$CF_3CF:CFCl$$

or $CF_2ClCF:CF_2$ or mixtures of the same to heating at substantially elevated temperatures in the presence of the herein described aluminum fluoride catalyst for a time sufficient to disproportionate a substantial amount of the starting material, and recovering, from the resulting reaction mixture, either or both of $CF_3CF:CF_2$ and $$CF_3CF:CCl_2$$

The reactions involved may be represented by the following:

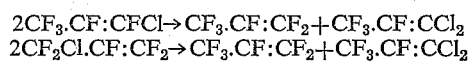

In accordance with the invention, it has been found that disproportionation, with formation of appreciable quantities of $CF_3CF:CF_2$ and $CF_3CF:CCl_2$ significantly takes place at temperature of about 300° C. Preferred low temperature for commercially acceptable yields is about 325° C. Temperatures as high as above 450° C. may be utilized without interfering with yields, although appreciably higher temperatures desirably should be avoided to prevent deactivation of catalyst and minimize breakdown of the organic materials. Operating temperatures higher than about 425° C. appear to afford no significant operating advantages. Hence, preferred temperature lie substantially in the range of 325–425° C.

Contact time may be varied considerably without noticeable disadvantage to process efficiency. Increasing contact time and reactor temperature result in higher conversion of starting materials to sought-for products, and lower contact time and reactor temperature result in lower conversion. In general, contact time may lie in the range of 2 to 50 seconds and preferably in the range of 5 to 30 seconds. To a substantial extent, contact time and reaction temperature are interrelated, and for any given operation optimum conditions may be determined by test runs.

In general practice, starting material is metered in vapor form into a tubular reactor, packed with the crystallite aluminum fluoride catalyst, made of suitable inert material such as nickel, and provided with external heating equipment preferably including automatic means for maintaining given temperatures in the reaction zone. Product recovery may be effected more or less conventionally as in this art. For example, reactor exit gases may be passed into a trap cooled to about minus 78° C. by a Dry Ice-acetone mixture. In this trap, the reaction products $CF_3CF:CF_2$ and $CF_3CF:CCl_2$, and also any unreacted chloropentafluoropropene starting materials are condensed. Separation and recovery of individual compounds may be effected by conventional fractional distillation. If desired, the $AlF_3$ catalyst exit may be passed directly into a water scrubber to remove trace amounts of any acid vapors which may have formed in the reaction. In this instance, any organic condensate formed in the scrubber may be separated from the water layer, dried and combined with the organic condensate of the cold trap for distillation.

Hexafluoropropene is a known commercial monomer. The $CF_3CF:CCl_2$ product is useful per se as a co-monomer. However, $CF_3CF:CCl_2$ can be readily reconverted to $CF_3CF:CFCl$ starting material by the reactions—

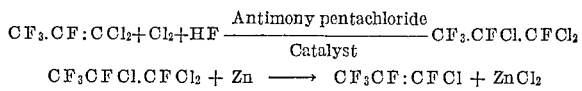

$CF_3CFCl.CFCl_2 + Zn \longrightarrow CF_3CF:CFCl + ZnCl_2$

Hence, if so desired the invention may be utilized to yield hexafluoropropene exclusively by reconversion of $CF_3CF:CCl_2$ to $CF_3CF:CFCl$.

Where the starting material is 3-chloropentafluoropropene, $CF_2Cl.CF:CF_2$, it is noted that reaction according to the invention procedure gives rise to some isomerization to the $CF_3CF:CFCl$. Such isomerization does not influence the net result, since the normal recycle of unreacted $CF_2Cl.CF:CF_2$ and isomer $CF_3CF:CFCl$ effects disproportionation to the same products.

Any decline of activity of the aluminum fluoride catalyst during long use may be completely restored by treatment with oxygen gas at temperatures of about 400–500° C. Time of such treatment may vary from 4 to 8 hours as needed. In many operations it may be desirable to protect the catalyst from decline in activity during long runs. Such protection may be effected by passing incoming reactants over activated carbon held at suitable elevated temperatures which may be in the range of 175–450° C. Pretreatment of this nature removes from incoming halocarbons certain unknown types of impurities which tend to poison catalysts. In the lower portion of the stated temperature range, activated carbon is inert, other than as a purifier, as shown by Example 4. As indicated by Example 2, at higher portions of such range, any incoming $CF_2ClCF:F_2$ is isomerized to $CF_3CF:CFCl$ to such an extent that most of the $C_3F_5Cl$ exiting the carbon pretreater is $CF_3CF:CFCl$.

The reactions described may be carried out at substantially atmospheric pressure. Usually, in large scale operation plus pressure of 2–0 p.s.i.g. is used to maintain gas flow thru the apparatus train. Sub- or super-atmospheres afford no operating advantages.

In the following examples the anhydrous aluminum fluoride catalyst employed had a crystallite size below about 200 Angstrom units radius and had been prepared by procedure substantially the same as in Example C of U.S.P. 2,676,996.

*Example 1.*—This example illustrates preparation of hexafluoropropene and 1,1-dichlorotetrafluoropropene-1 by disproportionation of 3-chloropentafluoropropene-1. Incoming $CF_2ClCF:CF_2$ was subjected to a carbon pretreatment. In this particular operation, the carbon was inert with regard to disproportionation, the carbon functioning only to remove certain not understood types of impurity from the incoming organic, and thus enhancing longevity of the disproportionating catalyst, i.e. the crystallite aluminum fluoride. The apparatus system included a pretreater and a reactor connected in series. The pretreater and the reactor were each a nickel tube 1″ I.D. and 36″ long, and each was enveloped substantially throughout its length by an electrical heating unit. The exit of the reactor was connected to a condensing trap cooled to about minus 78° C. by a Dry Ice-acetone mixture. The pretreater was filled with 0.438 liter (175 g.) of Columbia 6G activated carbon of about 8–14 mesh, and the reactor was filled with about 0.438 liter (438 g.) of the crystallite aluminum fluoride catalyst. Throughout the run, the carbon pretreater was maintained at temperatures in the range of about 170–232° C., averaging about 220° C., and temperature in the reactor was held in the range of about 374–399° C., averaging about 395° C. During a period of 4.3 hours, about 1177 g. (7.1 mols) of $CF_2ClCF:CF_2$ were fed as vapor into the inlet of the carbon pretreater. Passage of gases thru the system were such that contact time in the aluminum fluoride reactor was about 20 seconds. The exit gases of the aluminum fluoride reactor were condensed in the Dry Ice-acetone trap, and about 1128 g. of condensate were recovered. On fractional distillation of the organic condensate, there were recovered about 321 g. (2.14 mols) of $CF_3CF=CF_2$ representing about 30 mol percent yield based on the mols of starting material fed; 390 g. (2.13 mols) of $CF_3CF:CCl_2$ representing about a 30 mol percent yield; and 390 g. (2.13 mols) of $CF_3CF:CFCl$ representing a 30 mol percent yield. Conversion (mols of starting material consumed divided by mols of starting material fed and multiplied by 100) was about 60 mol percent. Following Example 4 shows that treatment of $CF_2ClCF:CF_2$ with activated carbon at temperatures below about 195–220° C. does not effect disproportionation of $CF_2ClCF=CF_2$ to $CF_3CF:CF_2$ or $CF_3CF:CCl_2$. Hence, it will be understood that the activated carbon in the instant example takes no part in the disproportionation reaction, and that the disproportionation demonstrated is effected entirely by the aluminum fluoride catalyst.

*Example 2.*—This run illustrates isomerization of $CF_2ClCF:CF_2$ to $CF_3CF:CFCl$ by subjecting the former to the action of activated carbon at relatively high temperatures, and shows that under these temperature conditions there is very little disproportionation of $$CF_2ClCF=CF_2$$

to $CF_3CF:CF_2$ and $CF_3CF:CCl_2$. The single reactor employed with a 1″ I.D. nickel tube about 36″ long, and enveloped substantially throughout its length with an electrical heating unit. Exit of the reactor was connected to a Dry Ice-acetone trap. The reactor was filled with 0.438 liter (175 g.) of Columbia 6G activated carbon of about 8–14 mesh. Throughout the run the temperature in the reactor was maintained in the range of about 426–452° C. averaging about 450° C. Over a period of about 4.5 hrs., about 1420 g. (8.52 mols) of $CF_2ClCF:CF_2$ contaminated with little $CF_3CF:CFCl$ was passed into the carbon reactor. Contact time was about 20 seconds. The exit gases were condensed and collected in the trap, and about 1273 g. of condensate were collected. On fractional distillation of the organic condensate there were recovered about 100 g. (0.67 mol) of $CF_3CF:CF_2$ representing about 7.7 mol percent yield based on the starting material fed; 1156 g. (6.91 mols) of 1-chloropentafluoropropene-1 $CF_3CF:CFCl$ representing about 81.3 mol percent yield; and 54 g. (0.30 mol) of $CF_3CF:CCl_2$ representing about 3.6 mol percent yield. Conversion (same basis as Example 1) of the $CF_2ClCF:CF_2$ starting material was about 92%. This example demonstrates that activated carbon at about 450° C. disproportionates $CF_2ClCF:CF_2$ to only a notably minor extent.

*Example 3.*—The apparatus employed was the same as in Example 1. During a 10½ hr. portion of a 128 hr. run, 1685 g. (10.2 mols) of $CF_2ClCF:CF_2$ were passed into and thru the pretreater-reactor system. During this 10½ hr. period, temperature in the carbon pretreater was maintained at about 400° C. and the aluminum fluoride catalyst in the reactor was maintained at a temperature of about 325° C. Contact time in the $AlF_3$ reactor was about 40 seconds. The exit gases of the aluminum fluoride catalyst reactor were handled substantially as before, and 1119 g. of organic condensate were recovered. On fractional distillation of the recovered condensate there were recovered 426 g. (2.84 mols) of perfluoropropene representing 42 mol percent of the total mols of the recovered organic condensate; 192 g. (1.15 mols) of a mixture of $CF_2ClCF:CF_2$ and $CF_3CF:CFCl$ representing 17 mol percent of the condensate; and 501 g. (2.74 mols) of $CF_3CF:CCl_2$ representing 40 mol percent of the condensate. Since Example 2 demonstrates that, in Example 3, the $C_3F_5Cl$ entering the aluminum fluoride reactor was roughly 90% $CF_3CF:CFCl$, it will be understood that Example 3 demonstrates the effectiveness of the aluminum fluoride catalyst for disproportionating $CF_3CF:CFCl$ to perfluoropropene and $CF_3CF:CCl_2$.

*Example 4.*—In this run, the single reactor employed was a 1″ I.D. nickel tube enveloped substantially throughout its length with an electrical heating unit. Reactor was filled with 0.438 liter (175 g.) of Columbia 6G activated carbon of about 8–14 mesh. Throughout the run, temperature in the reactor was maintained in the range of about 195–220°. 3-chloropentafluoropropene-1 was passed into and thru the reactor at a rate of about 1 mol/hr. The exit gas of the reactor was subjected to gas chromatography and was shown by infrared absorption spectra to be identical with the starting material. This run demonstrates that activated carbon at the temperature indicated is inert with respect to disproportionating or otherwise affecting $CF_2ClCF:CF_2$.

We claim:

1. The process which comprises heating starting material of the group consisting of $CF_2ClCF:CF_2$ and $CF_3CF:CFCl$ to temperatures substantially in the range of 300–450° C., in the presence of anhydrous aluminum fluoride catalyst and for a time sufficient to disproportionate a substantial amount of said starting material, said catalyst having crystallite size not substantially greater than 500 Angstrom units radius and having been derived by reaction of aluminum chloride and HF, and recovering, from the resulting reaction mixture, material of the group consisting of $CF_3CF:CF_2$ and $CF_3CF:CCl_2$.

2. The process of claim 1 in which temperature is substantially in the range of 325–425° C.

3. The process for making $CF_3CF:CF_2$ which comprises heating starting material of the group consisting of $CF_2ClCF:CF_2$ and $CF_3CF:CFCl$ to temperatures substantially in the range of 325–425° C. in the presence of anhydrous aluminum fluoride catalyst for a time sufficient to disproportionate a substantial amount of said starting material, said catalyst having crystallite size not substantially greater than 500 Angstrom units radius and having been derived by reaction of aluminum chloride and HF, and recovering $CF_3CF:CF_2$ from the resulting reaction mixture.

4. The process of claim 1 in which the starting material is $CF_2ClCF:CF_2$.

5. The process of claim 1 in which the starting material is $CF_3CF:CFCl$.

6. The process for making $CF_3CF:CF_2$ which comprises heating $CF_2ClCF:CF_2$ to temperature substantially in the range of 325–425° C. in the presence of anhydrous aluminum fluoride catalyst for a time sufficient to disproportionate a substantial amount of said starting material, said catalyst having crystallite size not substantially greater than 500 Angstrom units radius and having been derived by reaction of aluminum chloride and HF, and recovering $CF_3CF:CF_2$ from the resulting reaction mixture.

7. The process for making $CF_3CF:CF_2$ which comprises heating $CF_3CF:CFCl$ to temperatures substantially in the range of 325–425° C. in the presence of anhydrous aluminum fluoride catalyst for a time sufficient to disproportionate a substantial amount of said starting material, said catalyst having crystallite size not substantially greater than 500 Angstrom units radius and having been derived by reaction of aluminum chloride and HF, and recovering $CF_3CF:CF_2$ from the resulting reaction mixture.

References Cited in the file of this patent

UNITED STATES PATENTS

| | | |
|---|---|---|
| 2,478,201 | Miller et al. | Aug. 9, 1949 |
| 2,478,932 | Miller | Aug. 16, 1949 |
| 2,637,748 | Miller | May 5, 1953 |
| 2,676,996 | Miller et al. | Apr. 27, 1954 |
| 2,767,227 | Calfee et al. | Oct. 16, 1956 |

OTHER REFERENCES

Prober, J.A.C.S. 76 pp. 4189–4191 (1954).